J. R. MOFFATT.
SEWING AND TRIMMING MACHINE.
APPLICATION FILED AUG. 15, 1913.

1,235,911.

Patented Aug. 7, 1917.
4 SHEETS—SHEET 1.

Witnesses

Inventor
J. R. Moffatt
By
Attorneys

J. R. MOFFATT.
SEWING AND TRIMMING MACHINE.
APPLICATION FILED AUG. 15, 1913.
1,235,911.
Patented Aug. 7, 1917.
4 SHEETS—SHEET 2.
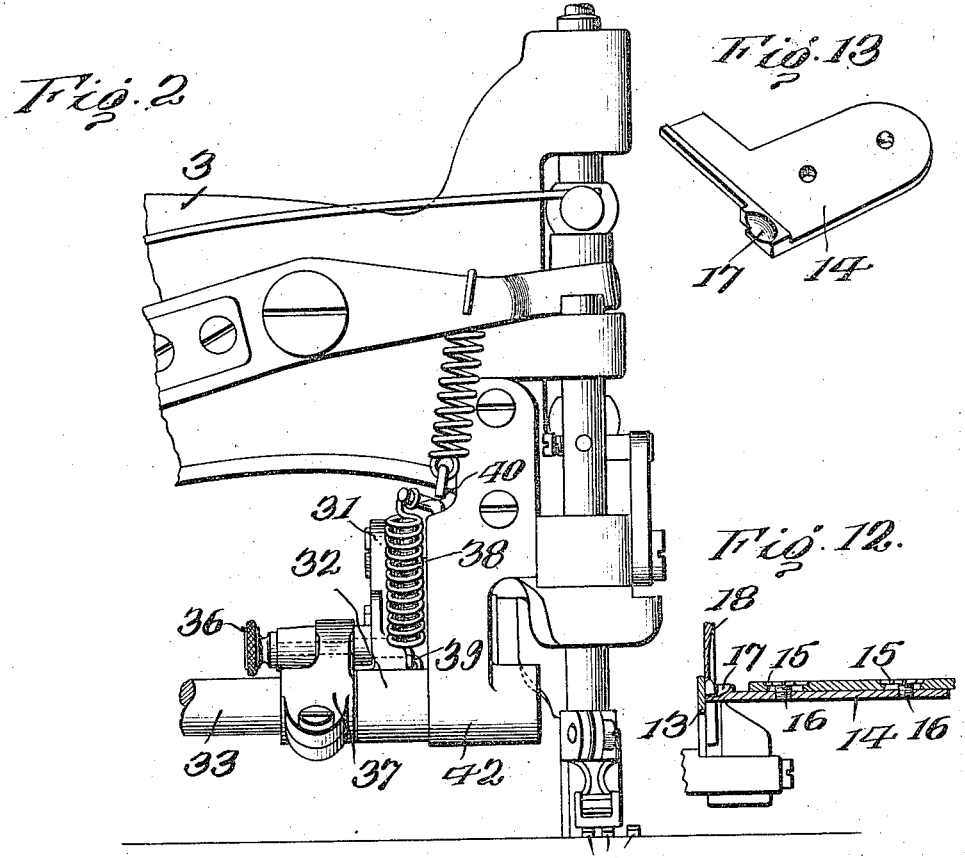
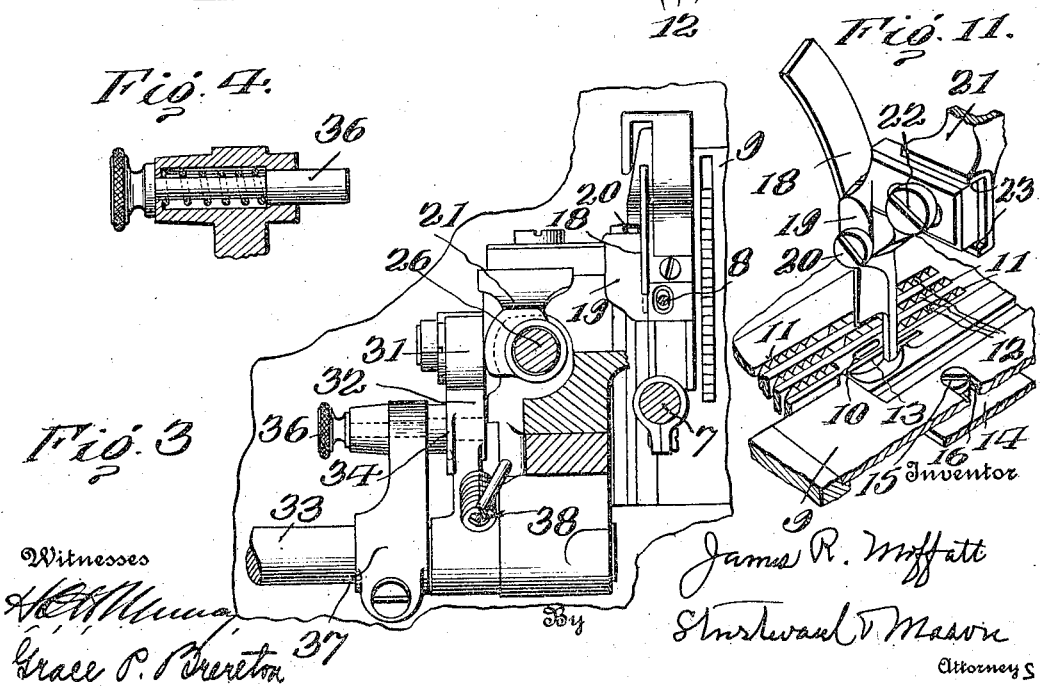

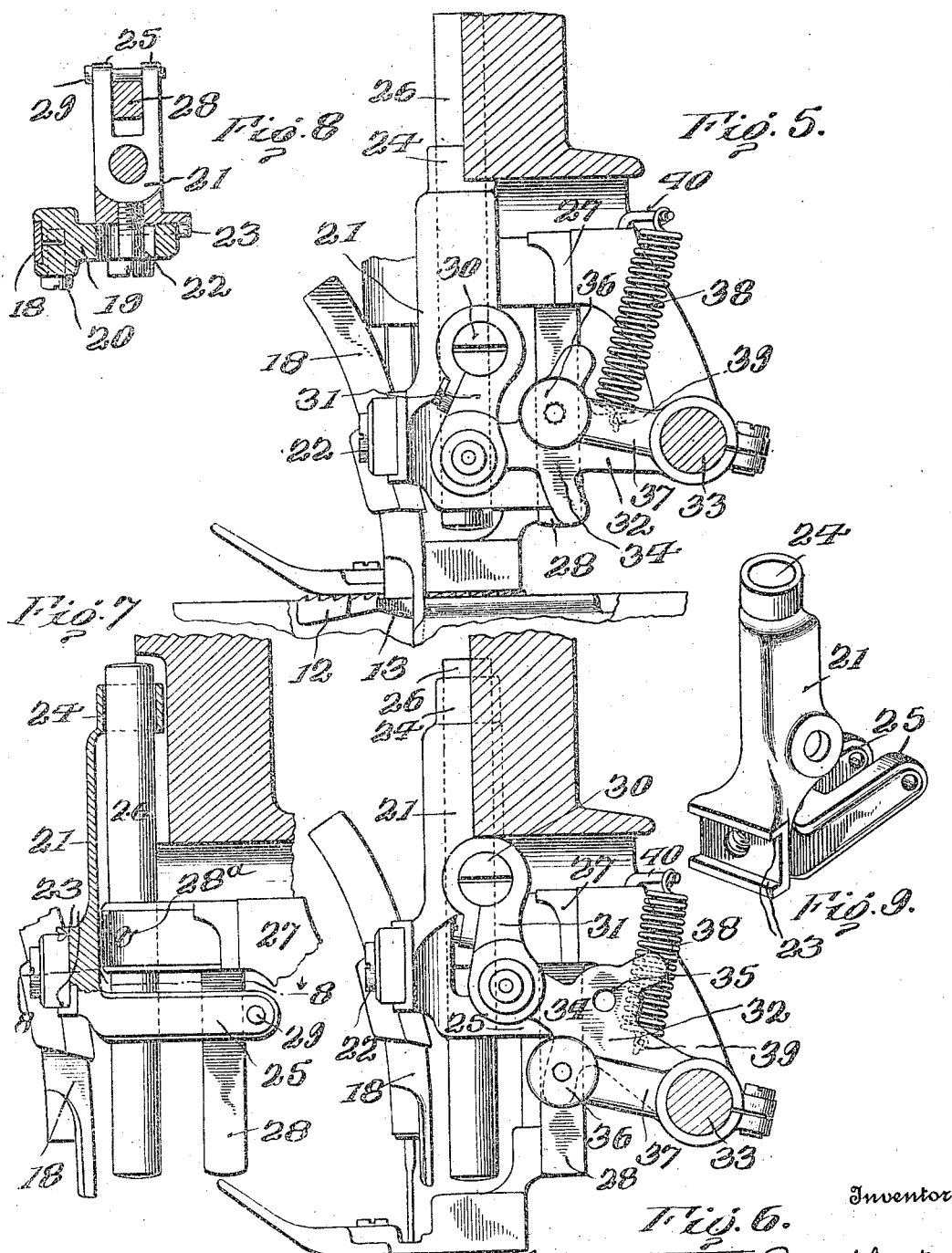

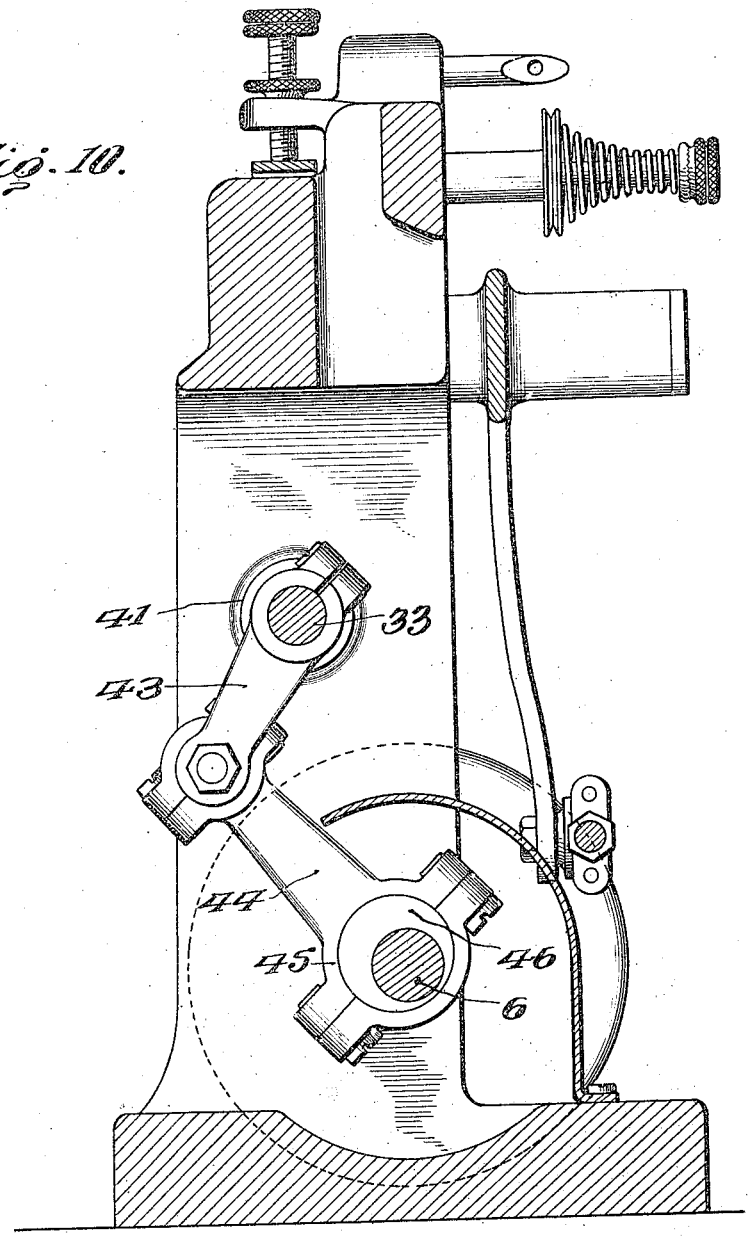

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

SEWING AND TRIMMING MACHINE.

1,235,911.   Specification of Letters Patent.   Patented Aug. 7, 1917.

Application filed August 15, 1913. Serial No. 784,952.

*To all whom it may concern:*

Be it known that I, JAMES R. MOFFATT, a citizen of the United States, residing at Chicago, in the county of Cook, State of Illinois, have invented certain new and useful Improvements in Sewing and Trimming Machines, of which the following is a description, reference being had to the accompanying drawing and to the figures of reference marked thereon.

My invention relates to improvements in sewing machines, and more particularly to a trimming mechanism for use in trimming heavy fabrics which are being seamed on the sewing machine.

In the type of trimmer which is operated by connections from the main shaft automatically, the trimmer has an up and down movement in the arc of a circle, and under the stress of cutting very heavy fabric considerable strain is placed upon the trimmer and the parts to which it is connected, and one of the objects of the present invention is to provide a trimming device operated from the main shaft, but which shall be so supported as to have a direct vertical movement without lateral strains upon the trimmer blade or the parts to which it is connected.

Another object is to provide a special construction of trimmer operating and trimmer connecting and disconnecting means whereby said trimmer may be thrown into and out of operation at the will of the operative to enable him to perform sewing and trimming, or just plain sewing, as desired.

The invention, therefore, consists in the matters hereinafter described and referred to in the appended claims.

In the accompanying drawings, which illustrate the invention,

Fig. 2 is a rear view of the same;

Fig. 3 is a plan view of the trimming mechanism, parts of the machine being shown in section;

Fig. 4 is a detail of the spring catch for engaging and releasing the trimmer;

Fig. 5 is a vertical section through the machine showing the trimmer mechanism in elevation and in its operating position;

Fig. 6 is a similar view showing the trimming mechanism in inoperative position;

Fig. 7 is a vertical sectional view through the trimmer mechanism;

Fig. 8 is a detail horizontal section on the line 8, 8 of Fig. 7;

Fig. 9 is a detail perspective of the movable member carrying the trimmer blade;

Fig. 10 is a vertical transverse sectional view through the machine showing the means for operating the trimming mechanism;

Fig. 11 is a detail perspective view of the throat plate, feed dogs and trimming blades;

Fig. 12 is a vertical detail section of the trimming blades and adjustable plate; and Fig. 13 is a detail perspective view of the adjustable plate for the trimming blades.

Figure 1:
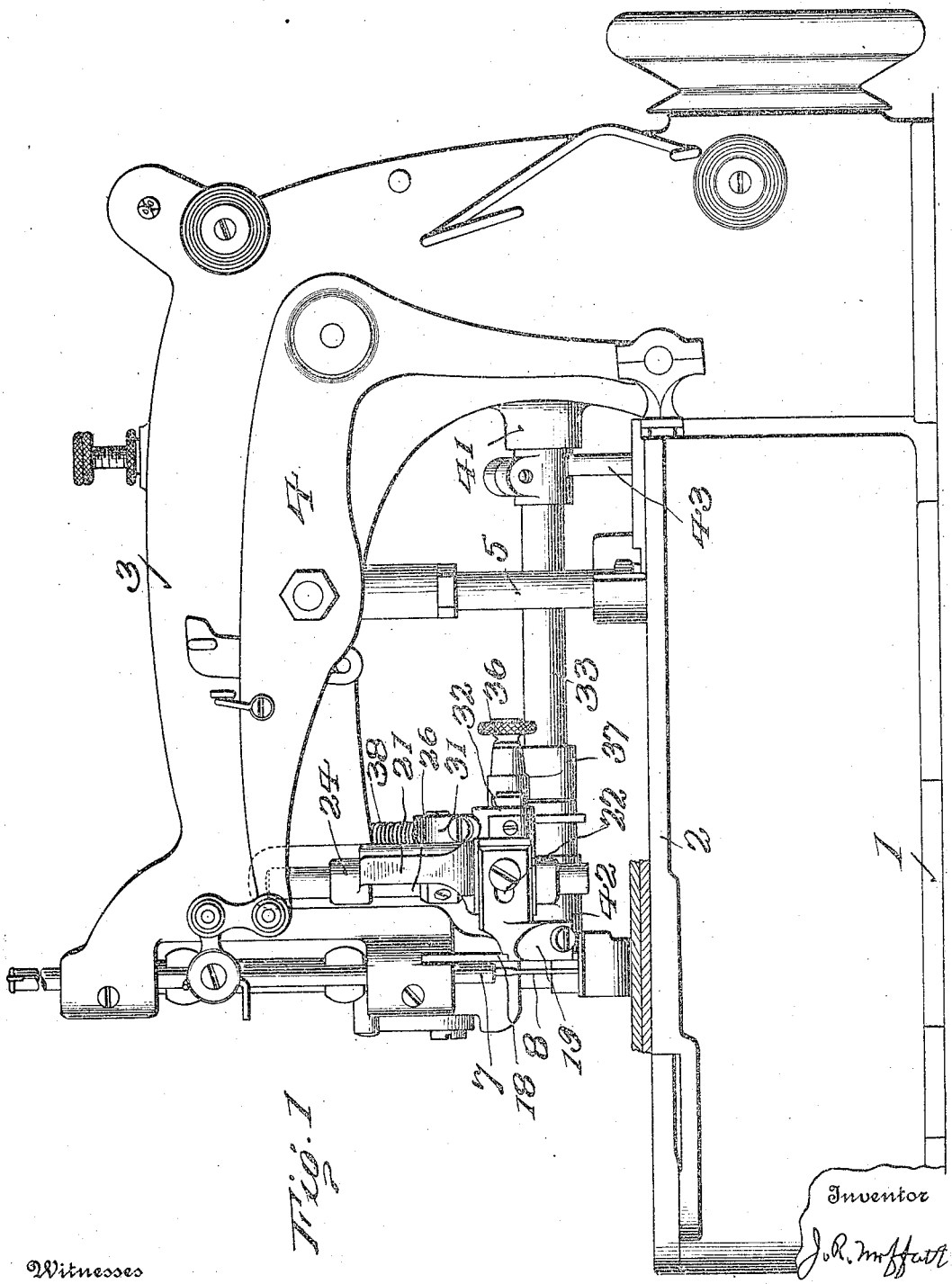
Figure 1 is a front view of a machine of the well-known Union Special type showing my improved trimming mechanism as applied thereto.

The sewing machine herein illustrated is one of the well known Union Special types, the parts such as the bed plate 1, the work support 2, the overhanging arm 3, the needle lever 4, the needle operating connecting rod 5, the main shaft 6, the needle bar 7, and the needle 8 are all of well-known construction and need not be specifically described. The throat plate 9, with the openings 10 and 11 for the passage of the needle and feed dog 12 respectively are also of the usual construction. Extending through the throat plate is the stationary or lower member of the trimmer which acts as a ledger blade. It is substantially flush with the throat plate, and may be secured thereto in any suitable manner below the work support. A plate 14 is carried by the work support and is adjustably located with respect to the stationary and movable trimming mechanisms by means of slots 15 and screws 16 (see Fig. 12), and has a recessed portion 17 in juxtaposition to the trimming members which serves as a means for deflecting the trimmed off strip.

Coöperating with the stationary trimming member is a movable member or plate 18. This movable member is carried by an arm 19 and held thereon by means of the screw 20. The arm 19 is in turn adjustably secured to the vertically arranged bracket 21 by means of the screw and slot connection 22 and by adjusting the arm 19 laterally within the guides 23 of the bracket 21 the movable blade 18 can be always positioned in the proper relation to the stationary blade. This bracket 21 has an upper sleeve portion 24 embracing the post 26 and has lower rearwardly extending arms 25. The post 26 is supported from the machine frame by means of a bracket 27 and a screw 28ª. The arms 25 of the vertically moving bracket portion 21 pass upon either side of the second post 28 attached to the machine frame, which post is rectangular in cross section, the arms being connected at their ends by the screw 29. By this construction of sleeve 24 surrounding the post 26 and arms 25 embracing the rectangular post 28, the vertical bracket 21 in its reciprocating movement is guided straight up and down without any lateral movement being permitted. Connected loosely to this movable bracket 21 by means of a screw 30 is a depending arm 31, which, at its lower end, is pivoted to another arm 32 loosely mounted upon the rock shaft 33, journaled on the rear of the machine frame, the arm 31 forming a pivoted link connection between the arm 32 and the movable bracket 21. The arm 32 has an arcuate section 34 in the upper portion of which there is an opening 35. Operating in conjunction with this is a spring catch 36 carried on the end of the connecting rod 37, which is fixed to the shaft 33. As shown in Fig. 5 the catch is in engagement with the opening 35 thereby causing the arms 32 and 37 to move as one when the shaft is oscillated. In Fig. 6 the catch 36 is shown withdrawn from the opening 35 and the arm 32 automatically rises, carrying with it the movable bracket 21 supporting the trimmer blade, through the action of the spring 38, fastened to the arms 32 and 39 and to the machine at 40. When the arm is thus elevated, the spring catch bears upon the lower surface of the arcuate section and, therefore, the movement of the rock shaft is not imparted to the trimming member, and the trimming blade 18 remains inactive, even though the machine may be in operation.

In positioning the trimming blade for operating to cut the fabric, the movable bracket is pushed down against the tension of the spring 38, until the spring catch 36 enters the opening 35, when the arms 32 and 37 will move as one. The bearings for the rock shaft 33 are shown at 41 and 42. This shaft 33 has secured to it an arm 43 and to this latter arm is pivoted one end of the arm 44, which terminates in the eccentric strap 45 embracing the eccentric 46 on the main shaft 6.

Having thus described my invention, what I claim is:

1. A trimming mechanism including a trimming blade, a movable support therefor, means for guiding the movable support, whereby it is moved up and down in the same path, and means for operating said support, including a rock shaft and engageable and disengageable connections between the rock shaft and the movable support, whereby the trimmer may be thrown into and out of operation at the will of the operator, said connections including an arm fixed on the rock shaft and an arm loose on the rock shaft, with a latching connection between the two, and a pivotal connection between the loosely mounted arm and the trimmer support.

2. A trimming mechanism including in combination a trimmer blade, a support therefor guided on fixed vertical posts attached to the machine frame, a rock shaft, an arm loosely mounted at one end of said rock shaft and at its opposite end having a pivotal latching connection with the trimmer support, an arm fixed on the rock shaft and having a link connection with the loosely mounted arm, said latching connection including a spring pin carried by the fixed arm coöperating with an apertured arcuate section on the loosely mounted arm.

3. A trimming mechanism including a work support, an overhanging arm, fixed posts mounted on the overhanging arm, a trimming blade support sleeved on one of said posts and having rearwardly extending arms embracing the other post, and means for reciprocating the trimmer support in a direct vertical line.

4. A trimming mechanism including fixed posts mounted on the machine frame, a trimming blade support sleeved on one of said posts and having rearwardly extending arms embracing the other post, and means for reciprocating the trimmer support in a direct vertical line, said means including a rock shaft, an arm loosely mounted at one end on the rock shaft, and having a pivotal link engagement at its opposite end with the trimmer support, a second arm fixed on the rock shaft and having latching engagement with the loosely mounted arm, and a spring for normally keeping the trimmer support out of operative position.

5. A trimming mechanism including a trimming blade, a movable support therefor, means for guiding the movable support whereby it is moved up and down in the same path, and means for operating said support including a rock shaft and engageable and disengageable connections between the rock shaft and the movable support, whereby the trimmer may be thrown into and out of operation, said connections including an arm fixed on the rock shaft, an arm loose on the rock shaft, and a latch connection between the two, and a link pivotally connected to said loosely mounted arm and projecting downwardly and connected to said movable support.

6. A trimming mechanism including a work support, a supporting post, a movable support, a trimmer blade attached to said movable support, said movable support having means above and below the connection to the blade for connecting said support to said post, means for preventing said support from turning on said post and means for reciprocating said support up and down on said post.

7. A trimming mechanism including a work support, an overhanging arm, a bracket attached to said overhanging arm and extending underneath the same, a post fixed to said bracket and extending above the lower face of the arm, said arm being recessed or cut away to receive the post, a movable trimmer support carried by said post, means for moving said trimmer support, and a trimming member carried by said support.

8. A trimming mechanism including a work support, a fixed trimming member carried by the work support, a movable trimming member coöperating therewith, said work support adjacent the fixed member having a recess formed in its upper face only, adapted to engage the trimmed off strip and deflect the same away from the trimming members.

In testimony whereof, I affix my signature, in the presence of two witnesses.

JAMES R. MOFFATT.

Witnesses:
A. B. CLOTHIER,
C. McNEIL.

Copies of this patent may be obtained for five cents each, by addressing the "Commissioner of Patents, Washington, D. C."